(12) United States Patent
Tan

(10) Patent No.: US 8,775,270 B2
(45) Date of Patent: Jul. 8, 2014

(54) METHOD AND SYSTEM FOR PROVIDING ONLINE SERVICES AND SOFTWARE THROUGH SCRATCHCARDS

(75) Inventor: Edwin Tan, Sunnyvale, CA (US)

(73) Assignee: Sky Castle Global Limited, Tortola (VG)

( * ) Notice: Subject to any disclaimer, the term of this patent is extended or adjusted under 35 U.S.C. 154(b) by 801 days.

(21) Appl. No.: 12/992,256

(22) PCT Filed: May 19, 2009

(86) PCT No.: PCT/US2009/003101
§ 371 (c)(1),
(2), (4) Date: Dec. 15, 2010

(87) PCT Pub. No.: WO2009/148503
PCT Pub. Date: Dec. 10, 2009

(65) Prior Publication Data
US 2011/0173089 A1    Jul. 14, 2011

Related U.S. Application Data

(62) Division of application No. 61/057,741, filed on May 30, 2008.

(51) Int. Cl.
*G06Q 30/00*    (2012.01)
*G06Q 30/06*    (2012.01)
*G06Q 20/34*    (2012.01)
*G06Q 50/18*    (2012.01)

(52) U.S. Cl.
CPC .......... *G06Q 30/0619* (2013.01); *G06Q 20/349* (2013.01); *G06Q 50/18* (2013.01); *G06Q 30/0631* (2013.01)
USPC .......................... 705/26.44; 705/26.7; 705/75

(58) Field of Classification Search
CPC .......... G06Q 30/0613; G06Q 30/0619; G06Q 30/0631; G06Q 20/02; G06Q 20/348; G06Q 20/349; G06Q 20/401; G06Q 20/409; G06Q 50/18
USPC .............................. 705/26.41, 26.7, 75, 26.44
See application file for complete search history.

(56) References Cited

U.S. PATENT DOCUMENTS 6,138,106 A    10/2000    Walker et al.
6,375,073 B1    4/2002    Aebi et al.
(Continued)

FOREIGN PATENT DOCUMENTS

CN    102113002 A    6/2011
CN    102113008 A    6/2011
(Continued)

OTHER PUBLICATIONS

Co-pending U.S. Appl. No. 11/903,227, filed Sep. 20, 2007.
(Continued)

*Primary Examiner* — Amee A Shah
(74) *Attorney, Agent, or Firm* — Perkins Coie LLP

(57) ABSTRACT

A method and system provides online software and services via prepaid scratchcards. Users may pay for online software and services with prepaid scratchcards. For example, online services may include accounting, legal, and auditing services. For example, online software may include productivity and business software. For example, online services and software may be provided on a subscription basis. Use of scratchcards may improve availability of software and services to more users, protect user security, and facilitate gifting between users.

20 Claims, 8 Drawing Sheets

(56) References Cited

U.S. PATENT DOCUMENTS

| | | | |
|---|---|---|---|
| 6,782,080 | B2 | 8/2004 | Leivo et al. |
| 7,000,028 | B1 | 2/2006 | Broadhurst et al. |
| 7,003,500 | B1 | 2/2006 | Driessen |
| 7,295,658 | B2 | 11/2007 | Moon et al. |
| 7,337,947 | B1 | 3/2008 | Swanson, Sr. |
| 7,440,922 | B1 | 10/2008 | Kempkes et al. |
| 7,697,920 | B1 | 4/2010 | McClain |
| 7,792,751 | B2 | 9/2010 | Tan |
| 8,406,392 | B2 | 3/2013 | Tan |
| 8,504,395 | B2* | 8/2013 | Vago et al. ............... 705/5 |
| 2001/0042784 | A1 | 11/2001 | Fite et al. |
| 2002/0046341 | A1 | 4/2002 | Kazaks et al. |
| 2002/0091649 | A1 | 7/2002 | Anvekar et al. |
| 2002/0095390 | A1 | 7/2002 | Hovsepian |
| 2002/0190123 | A1 | 12/2002 | Anvekar et al. |
| 2003/0004828 | A1 | 1/2003 | Epstein |
| 2003/0033246 | A1 | 2/2003 | Slater |
| 2003/0069974 | A1 | 4/2003 | Lu et al. |
| 2003/0104174 | A1 | 6/2003 | Itakura et al. |
| 2003/0128827 | A1 | 7/2003 | Khan |
| 2003/0144935 | A1 | 7/2003 | Sobek |
| 2003/0154179 | A1* | 8/2003 | Mercer ............... 707/1 |
| 2003/0208624 | A1 | 11/2003 | Grossman |
| 2004/0007618 | A1 | 1/2004 | Oram et al. |
| 2004/0088250 | A1* | 5/2004 | Bartter et al. ............ 705/39 |
| 2004/0139318 | A1 | 7/2004 | Fiala et al. |
| 2004/0181453 | A1 | 9/2004 | Ray et al. |
| 2004/0193490 | A1 | 9/2004 | Pletz |
| 2004/0260607 | A1 | 12/2004 | Robbins et al. |
| 2005/0027991 | A1* | 2/2005 | DiFonzo ............ 713/185 |
| 2005/0157801 | A1 | 7/2005 | Gore et al. |
| 2005/0199705 | A1 | 9/2005 | Beck et al. |
| 2005/0199706 | A1 | 9/2005 | Beck et al. |
| 2006/0116891 | A1* | 6/2006 | Muller et al. ............ 705/1 |
| 2006/0129501 | A1 | 6/2006 | Pastusiak et al. |
| 2006/0138215 | A1 | 6/2006 | Pallares |
| 2006/0213984 | A1 | 9/2006 | Walker et al. |
| 2006/0231611 | A1* | 10/2006 | Chakiris et al. ........... 235/380 |
| 2006/0233269 | A1 | 10/2006 | Bhushan et al. |
| 2006/0261154 | A1 | 11/2006 | Arthur et al. |
| 2006/0293963 | A1 | 12/2006 | Hoblit |
| 2007/0094129 | A1 | 4/2007 | Graves et al. |
| 2007/0100707 | A1 | 5/2007 | Driessen et al. |
| 2007/0110127 | A1 | 5/2007 | Mergen et al. |
| 2007/0112655 | A1 | 5/2007 | Jones |
| 2007/0118478 | A1 | 5/2007 | Graves et al. |
| 2007/0208869 | A1 | 9/2007 | Adelman et al. |
| 2007/0250920 | A1 | 10/2007 | Lindsay |
| 2007/0272743 | A1 | 11/2007 | Christie et al. |
| 2007/0288326 | A1 | 12/2007 | Boldin |
| 2008/0022375 | A1 | 1/2008 | Stanley |
| 2008/0041938 | A1 | 2/2008 | Wise |
| 2008/0070548 | A1 | 3/2008 | Cha et al. |
| 2008/0270282 | A1* | 10/2008 | Colucci-Zieger ............ 705/37 |
| 2008/0319908 | A1* | 12/2008 | Venkatachalam et al. ...... 705/50 |
| 2009/0013396 | A1* | 1/2009 | Rajunas, III ............ 726/9 |
| 2009/0192928 | A1 | 7/2009 | Abifaker |

FOREIGN PATENT DOCUMENTS

| | | |
|---|---|---|
| EP | 1531416 A1 | 5/2005 |
| KR | 20000035847 A | 6/2000 |
| KR | 20010084957 | 9/2001 |
| KR | 20030013074 | 2/2003 |
| KR | 20030091077 A | 12/2003 |
| KR | 20040075191 A | 8/2004 |
| KR | 20080028686 | 4/2008 |
| WO | WO-0111443 | 2/2001 |
| WO | WO 2007086068 A2 * | 8/2007 |
| WO | WO-2009148503 A2 | 12/2009 |
| WO | WO-2009149080 A2 | 12/2009 |
| WO | WO-2010019348 A2 | 2/2010 |
| WO | WO-2011066173 A2 | 6/2011 |

OTHER PUBLICATIONS

Co-pending U.S. Appl. No. 12/134,149, filed Jun. 5, 2008.
Co-pending U.S. Appl. No. 12/191,161, filed Aug. 13, 2008.
Co-pending U.S. Appl. No. 12/628,040, filed Nov. 30, 2009.
Craigslist Rolls Out New "Phone Verification Policy"; The e Sale Guys, http://esalesguys.blogspot.com/2008/02/craigslist-rolls-out-new-phone, Sep. 30, 2009; pp. 1-3.
Final Office Action Mailed Aug. 20, 2009 in Co-pending U.S. Appl. No. 12/134,149, filed Jun. 5, 2008.
International Search Report PCT/US2008/010044 dated Mar. 24, 2009, pp. 1-2.
International Search Report PCT/US2009/003101 dated Dec. 30, 2009.
International Search Report PCT/US2009/045965 dated Jan. 14, 2010.
International Search Report PCT/US2009/051011 dated Feb. 17, 2010, pp. 1-3.
Mark Furletti, Prepaid Card Markets & Regulation, Feb. 2004, Federal Reserve Bank of Philadelphia, pp. 1-19.
Non-Final Office Action Mailed Mar. 12, 2009 in Co-pending U.S. Appl. No. 12/134,149, filed Jun. 5, 2008.
Notice of Allowance Mailed Jan. 13, 2010 in Co-pending U.S. Appl. No. 12/134,149, filed Jun. 5, 2008.
Written Opinion PCT/US2009/045965 dated Jan. 14, 2010; pp. 1-4.
Written Opinion PCT/US2009/051011 dated Feb. 17, 2010, pp. 1-5.
Extended European Search Report with Supplementary European Search Report and European Search Opinion EP 09759240.6 dated Jan. 23, 2012, pp. 1-8.
Office Action Mailed Dec. 1, 2011, in Chinese Patent Application No. 200980130786.6, pp. 1-4.
Office Action Mailed Feb. 24, 2012, in Chinese Patent Application No. 200980130784.7, pp. 1-3.
Co-Pending U.S. Appl. No. 13/310,557, filed Dec. 2, 2011.
Co-Pending U.S. Appl. No. 13/346,661, filed Jan. 9, 2012.
Non Final Office Action Mailed Mar. 21, 2011 in U.S. Appl. No. 11/903,227, filed Sep. 20, 2007.
Advisory Action Mailed Apr. 3, 2012 in U.S. Appl. No. 12/628,040, filed Nov. 30, 2009.
Non-Final Office Action Mailed Mar. 29, 2012, in U.S. Appl. No. 12/191,161, filed Aug. 13, 2008.
Co-pending U.S. Appl. No. 61/057,741 of Edwin Tan filed May 30, 2008.
Co-pending U.S. Appl. No. 61/419,128 of Edwin Tan filed Dec. 2, 2010.
Co-pending U.S. Appl. No. 61/472,215 of Edwin Tan filed Apr. 6, 2011.
Final Rejection Mailed Nov. 7, 2011 in Co-pending U.S. Appl. No. 12/628,040, filed Nov. 30, 2009.
Final Rejection Mailed Sep. 13, 2011 in Co-pending U.S. Appl. No. 11/903,227, filed Sep. 20, 2007.
International Search Report PCT/US2010/057290 dated Jan. 21, 2011, pp. 1-3.
Non-Final Rejection Mailed Jan. 4, 2011 in Co-pending U.S. Appl. No. 12/628,040, filed Nov. 30, 2009.
Notice of Allowance Mailed Jul. 26, 2010 in Co-pending U.S. Appl. No. 12/134,149, filed Jun. 5, 2008.
Restriction Requirement Mailed Mar. 21, 2011 in Co-pending U.S. Appl. No. 11/903,227, filed Sep. 20, 2007.
Restriction Requirement Mailed Aug. 23, 2011 in Co-pending U.S. Appl. No. 12/628,040, filed Nov. 30, 2009.
Restriction Requirement Mailed Feb. 2, 2011 in Co-pending U.S. Appl. No. 11/903,227, filed Sep. 20, 2007.
Restriction Requirement Mailed Nov. 9, 2010 in Co-pending U.S. Appl. No. 12/628,040, filed Nov. 30, 2009.
Written Opinion PCT/US2008/010044 dated Mar. 24, 2009; pp. 1-2.
Written Opinion PCT/US2009/003101 dated Dec. 30, 2009; pp. 1-3.
Written Opinion PCT/US2009/057290 dated Jun. 21, 2011; pp. 1-4.
Co-pending U.S. Appl. No. 12/992,256 of Edwin Tan filed Dec. 15, 2010.
Co-pending U.S. Appl. No. of Edwin Tan 61/419,128, filed Dec. 2, 2010.

(56) References Cited

OTHER PUBLICATIONS

Non-Final Rejection Mailed Mar. 21, 2011 in Co-pending U.S. Appl. No. 11/903,227, filed Sep. 20, 2007.
Restriction Requirement Mailed May 14, 2012 in Co-pending U.S. Appl. No. 13/346,661, filed Jan. 9, 2012.
Co-pending U.S. Appl. No. 13/830,450 by Tan, E., et al. filed Mar. 14, 2013.
Co-pending U.S. Appl. No. 13/830,655, by Tan, E., et al. filed Mar. 14, 2013.
U.S. Appl. No. 13/850,049 by Tan, E., filed Mar. 25, 2013, now abandoned.
Non-Final Office Action Mailed Jul. 16, 2012, in Co-pending U.S. Appl. No. 13/346,661 by Tan, E., filed Jan. 9, 2012.
Final Office Action Mailed Jan. 21, 2013, in Co-pending U.S. Appl. No. 13/346,661 by Tan, E., filed Jan. 9, 2012.
Non-Final Office Action Mailed Oct. 16, 2012, in U.S. Appl. No. 12/191,161 by Tan, E., filed Aug. 13, 2008.
Notice of Allowance Mailed Nov. 16, 2012, in U.S. Appl. No. 12/191,161 by Tan, E., filed Aug. 13, 2008.
Restriction Requirement mailed Aug. 15, 2013, in Co-pending U.S. Appl. No. 13/310,557 by Tan, E., et al. filed Dec. 2, 2011.
Non-Final Office Action mailed Sep. 13, 2013, in Co-pending U.S. Appl. No. 13/310,557 by Tan, E., et al. filed Dec. 2, 2011.
Non-Final Office Action mailed Aug. 21, 2013, in Co-pending U.S. Appl. No. 13/830,450 by Tan, E., et al. filed Mar. 14, 2013.
Restriction Requirement mailed Aug. 16, 2013, in Co-pending U.S. Appl. No. 13/830,655, by Tan, E., et al. filed Mar. 14, 2013.
Non-Final Office Action mailed Oct. 17, 2013, in Co-pending U.S. Appl. No. 13/830,655, by Tan, E., et al. filed Mar. 14, 2013.

* cited by examiner

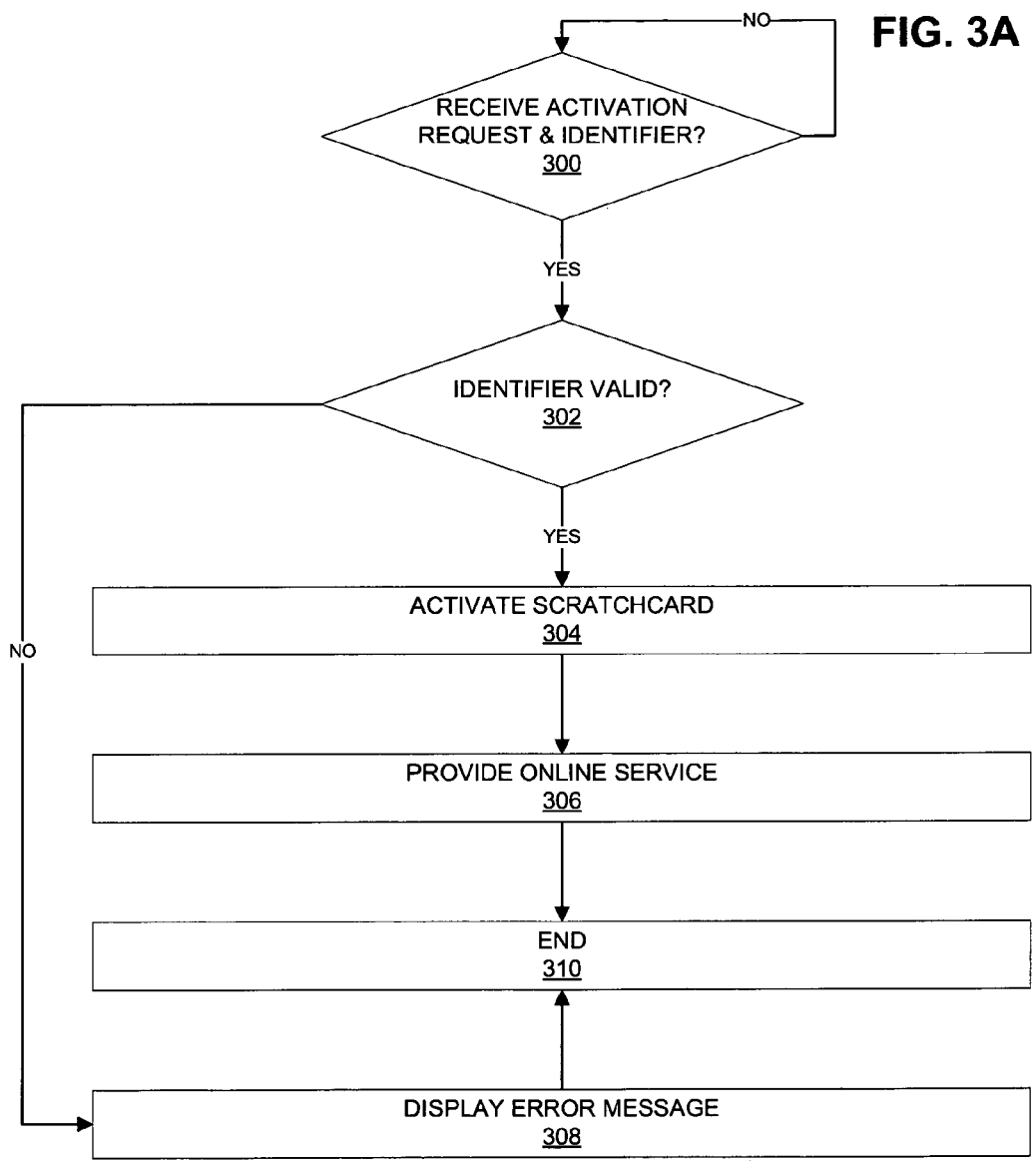

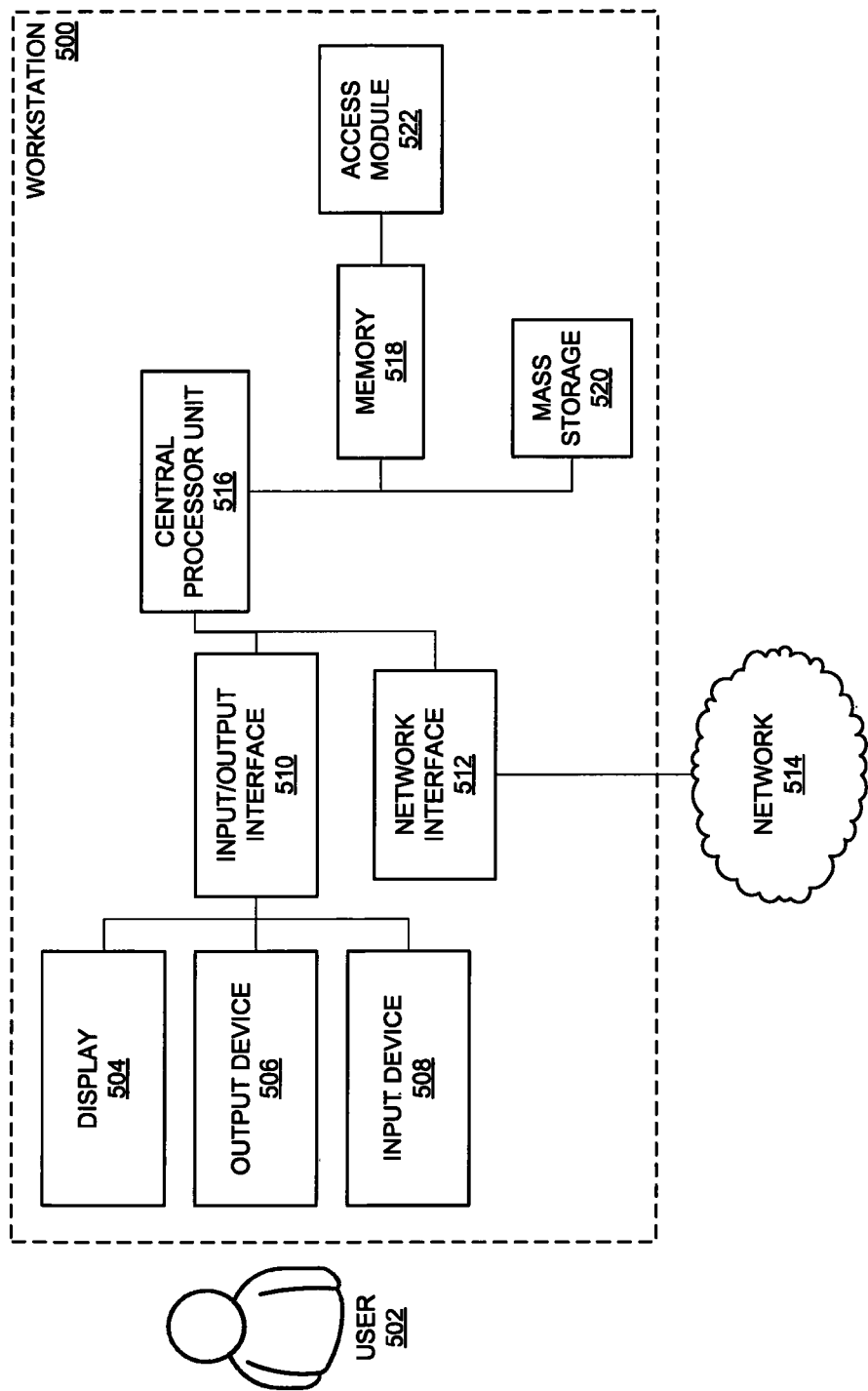

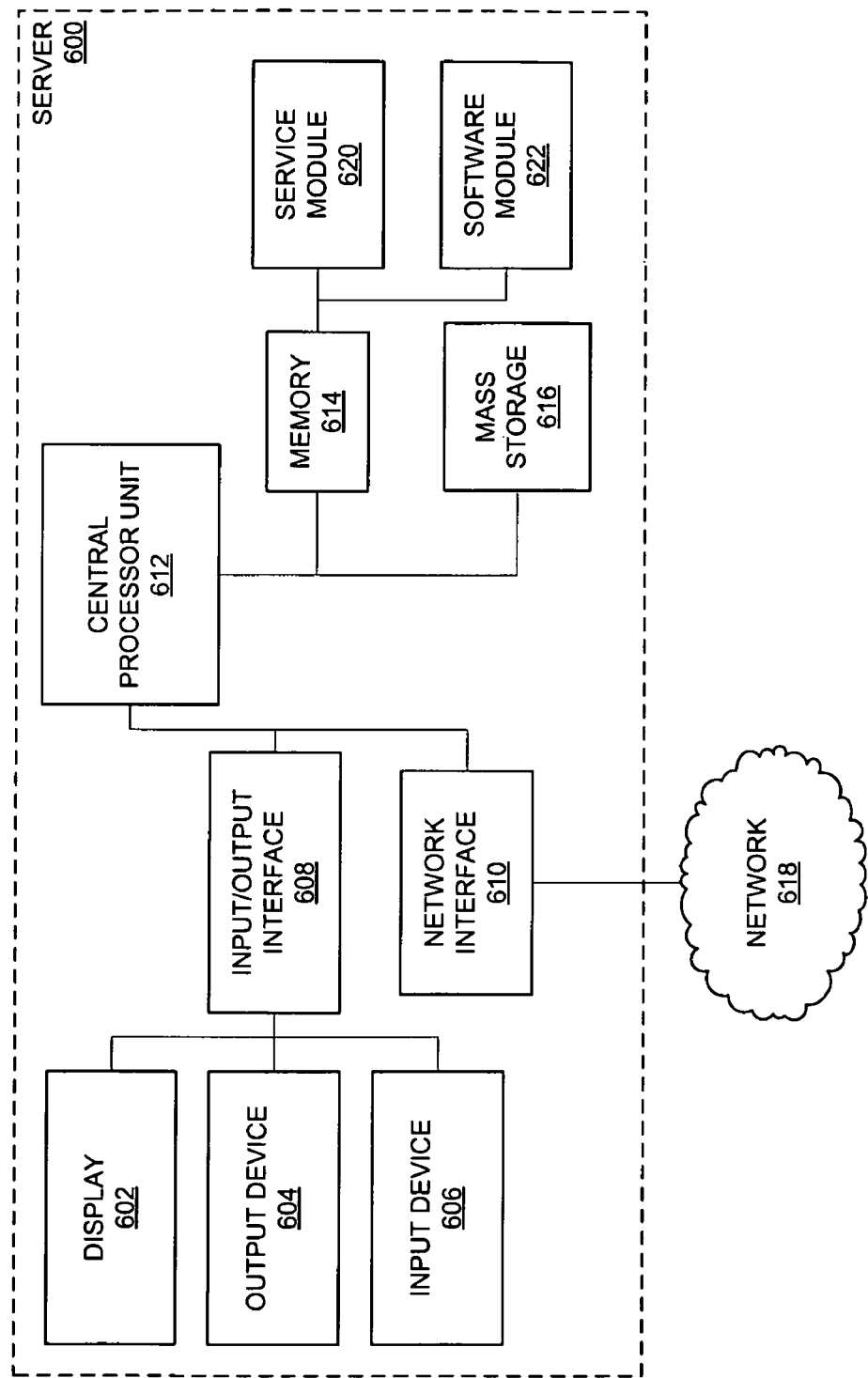

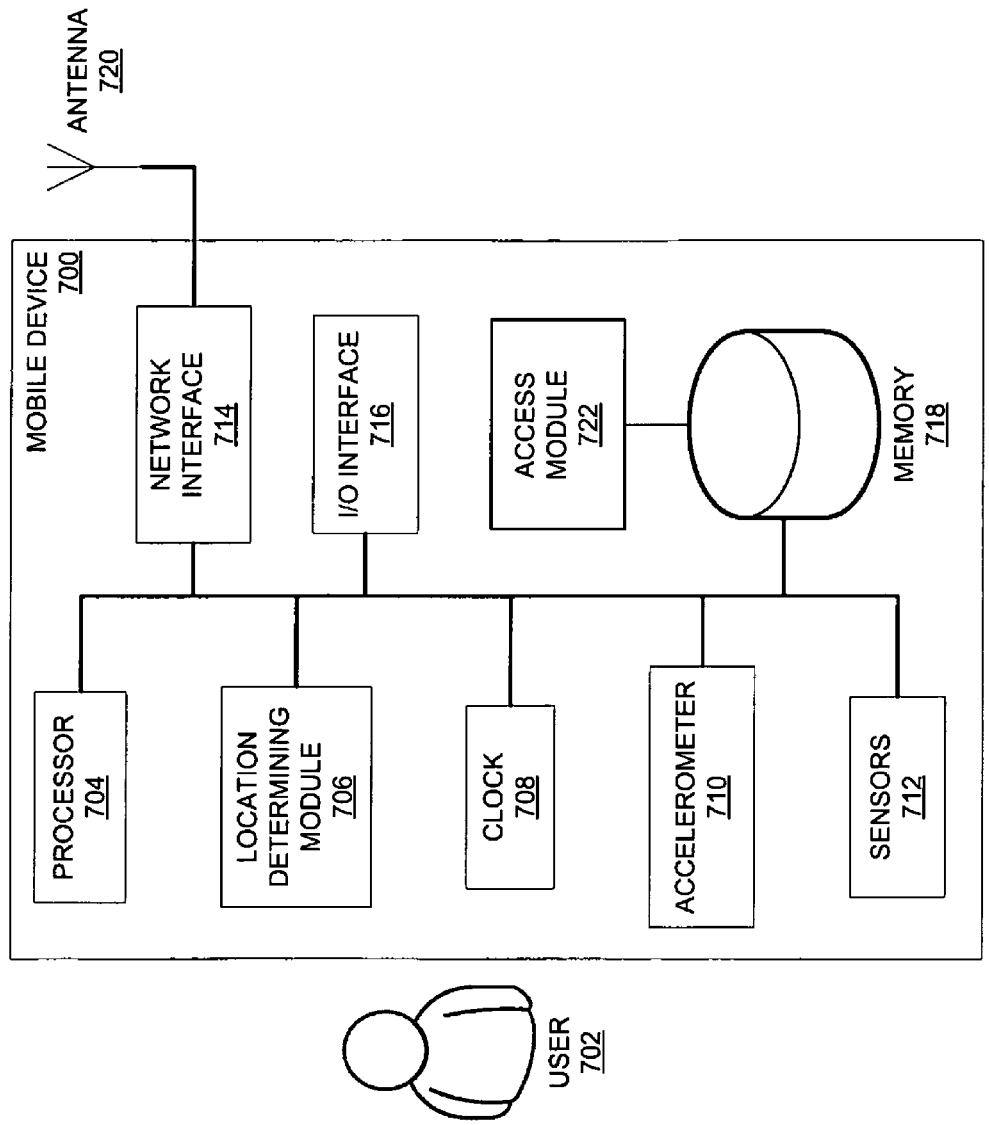

METHOD AND SYSTEM FOR PROVIDING ONLINE SERVICES AND SOFTWARE THROUGH SCRATCHCARDS

CLAIM OF PRIORITY

This application is a 35 USC §371 application of International Application No. PCT/US09/003101 filed May 19, 2009 and claims priority to U.S. Provisional Application No. 61/057,741, filed May 30, 2008, both which are incorporated herein by reference.

BACKGROUND

A prepaid card is a financial product that provides an alternative payment mechanism for making purchases besides cash and credit. In practice, a prepaid card can be used similar to a debit card, where a customer deposits an opening balance, from which subsequent purchases are deducted.

The prepaid card can be a plastic card with an associated identifier, or it can rely solely on such an identifier for its existence. Therefore, the prepaid card is a specific form of debit or stored-value card. However, the prepaid card can be loaded with funds manually and is not normally tied to a bank account from where funds are withdrawn.

Online services can include Web-based versions of existing services. For example, professional services such as accounting, legal, audit can be provided over a combination of the Internet, telephone, and other communication technologies. This eliminates the need for physical face-to-face meetings between a client and a service provider.

Online applications can be Web-based versions of existing applications. Example online applications include word processors, spreadsheets, and presentation applications. Online applications are accessible to users over the Web, in contrast to traditional computing model where the applications are installed and executed at a local computer. Resulting files in online applications are also saved online and not on a local hard disk. Online applications are typically easier to maintain because users do not need to install or update software on a local machine. The application is executed at a server, with the user interface provided to the user over a network.

A large barrier to providing online software and services to users and customers over a wide network, such as the Internet, is ensuring payment. In many cases, receiving cash for payment is impractical due to physical distance and security. Furthermore, processing credit such as credit cards can be cost-prohibitive for small payments.

Thus, there is a need for a low-cost and secure prepaid card system for providing online software and services.

BRIEF DESCRIPTION OF DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 3A illustrates a first example procedure for providing online applications and services associated with a scratchcard.

FIG. 5 illustrates an example workstation for accessing online software and services.

FIG. 6 illustrates an example server for providing Online software and services.

FIG. 7 illustrates an example mobile device for accessing online software and services.

DETAILED DESCRIPTION

A server provides online software and services to users with valid prepaid scratchcards. A scratchcard server activates and authenticates scratch cards. This improves availability of online software and services to more users, protect user security, and facilitate gifting between users.

Figure 1:
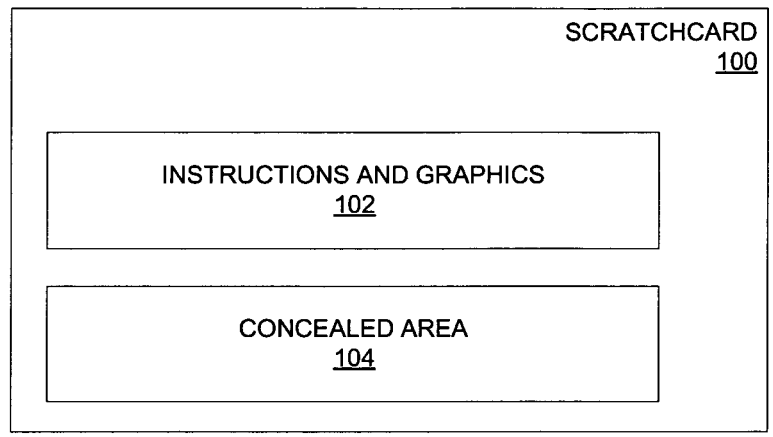
FIG. 1 illustrates an example scratchcard.

FIG. 1 illustrates an example scratchcard. A scratchcard 100 (also called a scratch off, scratch ticket, scratcher, scratchie, scratch-it, scratch game, or instant game) can be a small token in the form of a card, usually made of cardboard or plastic, including instructions 102 and one or more concealed areas 104 contain information. The concealed area 104 can be covered by an opaque substance such as latex that cannot be seen through, but can be scratched off or otherwise removed by a user.

It will be appreciated that the card face of the scratchcard 100 can be customizable. For example, a purchase can specify a background and graphics to be depicted on the scratchcard 100.

The instructions and graphics 102 can include a scratchcard value. For example, the scratchcard value can be a prepaid product or service, as discussed below. Alternatively, the prepaid scratchcard can be associated with a prepaid balance redeemable for products or service, as discussed below.

Alternatively, the concealed area 104 can be covered with a peel-off strip configured to be peeled off by the user. The strip is opaque and cannot be seen through, but can be easily removed by the user to reveal the concealed information. Alternative coverings that are easily removed by the user can also be used.

The scratchcard 100 can be plastic and in the approximate shape, size, and weight as a credit card. This facilitates user transportation of the scratchcard 100 by users and improves user familiarity and comfort.

The scratchcard 100 can include a title and instructions 102 printed on its faces, both front and back. The scratchcard 100 can also have graphics or text printed or otherwise displayed on its faces.

The scratchcard 100 can be individually packaged in transparent plastic to protect it from handling during shipping and sale and yet allow its printed surfaces to be visible to a user or purchaser. The scratchcard 100 can be packaged together in groups. In one example, scratchcards of a same type are packaged together for sale. In another example, scratchcards for complementary products or services are packaged together for sale. In one embodiment, scratchcards can be sold in bulk at a discount.

The scratchcard 100 can include a Radio-Frequency Identification (RFID) chip and comply with a relevant RFID standard. For example, this allows the scratchcard to be automatically detected when passed through a checkout scanner.

RFID enabled scratchcards can be processed at a checkout counter and automatically activated without requiring a physical scan of a machine-readable medium. In addition, bundled scratchcards can each have an RFID chip, allowing a distribution network to track each scratchcard from manufacture to transport to sale to activation.

The scratchcard 100 can include a computer-readable medium. For example, the concealed information can be stored in encrypted form in the computer-readable medium. The computer-readable medium can include executable binary code for the user. In one embodiment, the scratchcard provides prepaid will drafting services by an attorney. The computer-readable medium includes basic forms and questionnaires for the user to complete before contacting the attorney. The user can transmit the completed forms and questionnaires to a participating attorney along with the identifier. After authenticating the identifier, the attorney will prepare the will based on the user-submitted information and transmit a completed will to the user.

In another embodiment, the computer-readable medium can contain an encryption key. For example, the encryption can be used by the user on a client in communication with an online service server or online application server. By providing a unique key with each scratchcard, communications between the servers and the user's client is secured. The key can be a public/private key pair used for encrypting and decrypting communications over a network. Other encryption keys can also be used, separately or in combination.

In another embodiment, the scratchcard 100 provides subscription service to an online service, such as a stock photo collection. The computer-readable medium can include photo viewing, download and billing software that improves a user's access of the stock photo collection.

Alternatively, the computer-readable medium includes software facilitating the use of the online service. For example, the online service can require client software be installed at a client terminal.

It will be appreciated that a scratchcard can take multiple forms, such as a physical object, a gift certificate, a gift card, an email message, an email address, etc. Any object that will securely convey an identifier can be used as a scratchcard. It will be appreciated that security effectiveness varies, and lesser security can be accepted in exchange for increased user convenience.

Various security measures can be used to prevent counterfeiting and theft of scratchcards. In one example, the scratchcard is distributed in an inactive state. When the scratchcard is sold, for example, at a point-of-sales terminal, its identifier is transmitted to an activation server. The activation server notes that the identifier is associated with a scratchcard that has been sold. This both prevents the theft of un-purchased scratchcards from retail stores and improves monitoring of scratchcard sales. Alternative security measures include security watermarks, holograms, and other tamper-proof markings.

In another example, the scratchcard 100 can be activated using an existing credit card network. For example, a nominal charge can be placed on a pseudo-account stored at the activation server, at which point the scratchcard will be noted as sold and activated.

In another example, an activation identifier stored on the scratchcard 100 is transmitted along with an authorization code to the activation server. For example, the activation identifier can be stored on a machine-readable code, a magnetized plastic strip, a magnetic stripe, an RFID chip, etc. For example, the authorization code can be predetermined at a point-of-sales terminal or manually entered by a cashier. When the activation server receives both the activation identifier and the authorization code, the scratchcard is activated. Notification can be provided via a receipt-like paper/thermal printout.

In another example, the scratchcard 100 can be activated over the telephone line. In this example, the activation identifier can be the scratchcard identifier. The authorization code can be a store owner Personal Identification Number (PIN). When the scratchcard is sold, the storeowner dials a predetermined telephone number and is connected with an audio interface of the activation server. The storeowner enters the scratchcard identifier and his PIN, and the scratchcard is activated. This example does not require the storeowner to install any additional hardware to support activation of scratchcards.

In another example, the scratchcard 100 can be sold with a receipt that includes an activation code. The user can activate the scratchcard at his convenience from any client configured to transmit the scratchcard identifier and the activation code to the activation server.

In another example, activation functionality can be provided by additional software installed on existing point-of-sale machines. This allows currently-installed point-of-sale machines to be upgraded to support scratchcard activation, reducing transaction costs.

In another example, deactivation functionality can be supported. For example, a user can return an unused scratchcard for a refund. The point-of-sale machine can check with the activation server to ensure the scratchcard has remained unused before deactivating the scratchcard. A refund can then be issued to the user.

The scratchcard 100 can be sold for any price determined by a manufacturer or retailer. Alternatively, the scratchcard can be given, handed out, mailed, or otherwise provided to users for free as promotional items.

It will be appreciated the scratchcard 100 can be sold through a variety of sales channels. For example, the scratchcard 100 can be sold from an automated kiosk, a retail store, online via a website or online store, or via mobile device applications.

Figure 2:
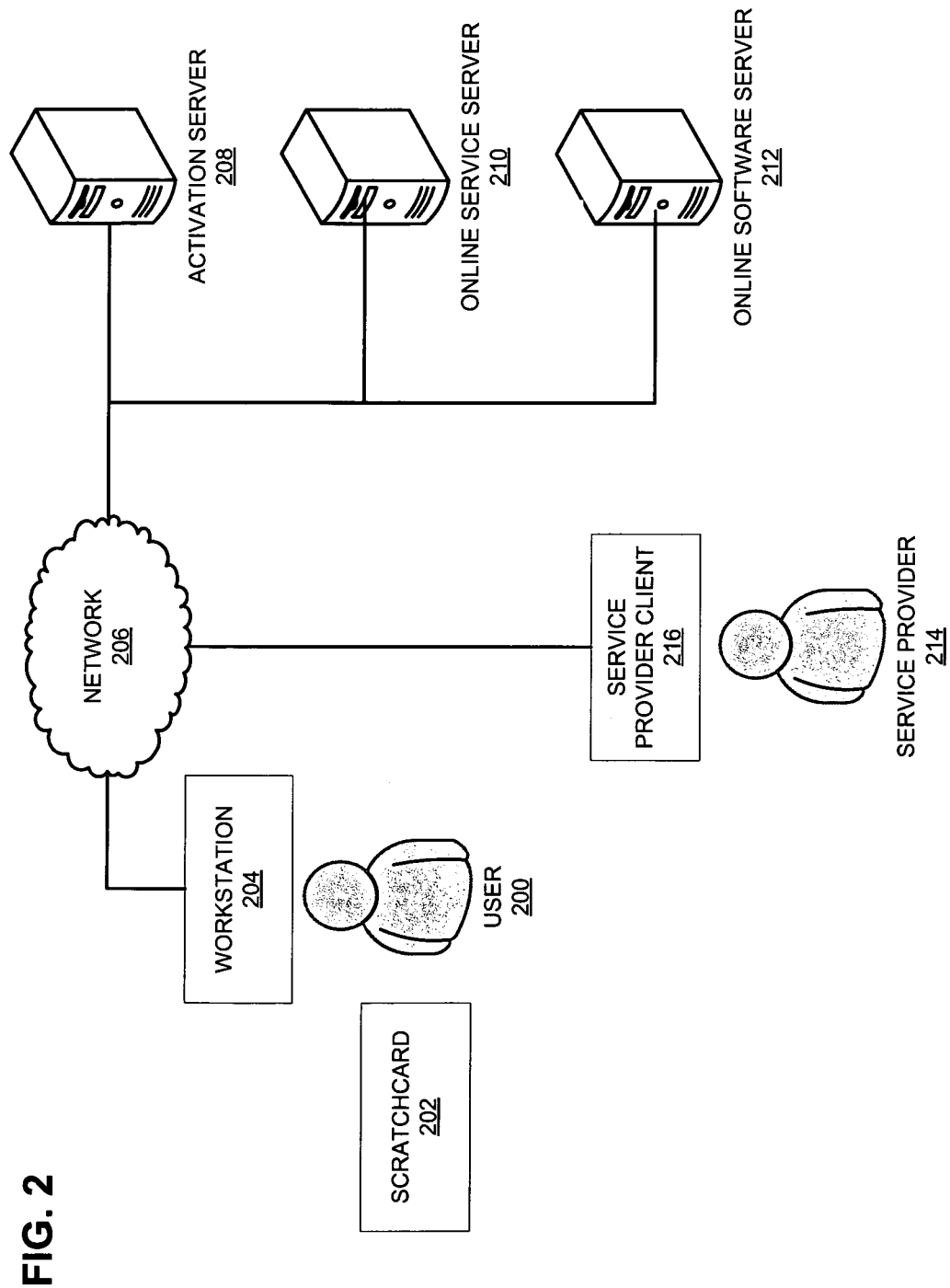
FIG. 2 illustrates an example system for providing online applications and services associated with a scratchcard.

FIG. 2 illustrates an example system for providing online applications and services associated with a scratchcard. A user 200 can purchase a scratchcard 202, for example, from a store or an automated kiosk, and access a user client in communications with a network. The scratchcard can be as illustrated above in FIG. 1.

The user 200 can access a user client, workstation or terminal 204 to access a network 206. The workstation 204 can be as illustrated in FIG. 5. It will be appreciated that the workstation 204 can alternatively be a mobile device, such as a wireless personal digital assistant, a netbook, or a cellular phone.

The network 206 can be the Internet or another network configured to carry information. The workstation 204 can execute an application providing a user interface with the servers, discussed below. It will be appreciated that other networks can be used, such as telephone or cellular networks. This allows the user 200 greater flexibility to activate and utilize the scratchcard 202. This also provides great flexibility to the user 200 in receiving the service or software.

An activation server 208 can be in communication with the network 206. The activation server 208 can include activation functionality as discussed above. The activation server 208 can also track scratchcard usage after activation. For example, a scratchcard can be associated with a declining value, such as a six month subscription to a news website. The activation server 208 will track when the subscription expires and deactivate the user's subscription at expiration.

An online service server 210 can be in communication with the network 206. The online service server 210 can be configured to provide one or more online service to the user via the network. For example, online services can include Voice-Over-IP (VoIP), web hosting, database hosting services, and application hosting. VoIP services will route a user's voice transmission to a specified receiver. Web hosting will serve webpages of a website to requesting browsers over the Network. Database hosting services will provide access to a stored database hosting.

For example, online services can include network computing. A prepaid subscription gives the user access to computing power delivered over the network. The user client can be a thin client and connect with the online service provider with an existing protocol, such as Virtual Network Computing (VNC).

For example, online services can include accounting, legal, audit, web design or other professional services. Services can be provided by service provider via a service provider client over the network. Once the activation server has received a valid scratchcard identifier, it transmits an authorization to a service provider, who can then provide the prepaid service. The activation server, the user client, and the service provider client can communicate additional information required by the service provider. Two-way communication can occur between the user client and the service provider client if the service is provided in an interactive manner.

An online software or application server 212 can be in communication with the network 206. The online software server 212 can be configured to provide one or more online applications to the user client via the network.

Application hosting includes hosting network-accessible applications on the online services server. Such technologies allow a user to focus on application building and not hosting logistics. Example application hosts include Google App Engine and Amazon Web Services.

For example, online application can include Web-based software, such as productivity software, budgeting or money management software, business software, or learning software. Free versions of web-based software can be made available for trial or other purposes, while advanced features can require a user to first purchase a prepaid scratchcard and executing an activation procedure. Learning software suites are provided by, for example, Blackboard.com and Moodle. Other services such as client relation management software can be offered over the Internet. Other services such as synchronization and mirroring software can be offered over the Internet.

It will be appreciated that any number of user clients, service provider clients, activation servers, online service servers, and online application servers can exist in the system, and the servers can interact in multiple combinations.

Other example online software and services available over the illustrated system include the following:

A domain name registration service or management software. The user can receive a scratchcard and access a domain name registration server. The user receives domain name registration services after the scratchcard is authenticated. In another embodiment, a domain name management software is made available to the user over the network, for example, to manage one or more user domain names.

A domain name WHOIS identity protection service to protect user privacy when registering a domain name. For example, ICANN requires certain information when registering a domain name, such as contact information for a contact person associated with the registration. Such information is publicly available via a WHOIS query. A WHOIS identity protection service can provide a valid third party contact information, which forwards all received communications to the user. Similarly, software modules can be provided via scratchcard activation or rental.

A user identification and verification service and/or software can be provided. The user activates the above service to verify and authenticate a received third party contact info. For example, the user can administer a website and wish to authenticate website viewers. Viewer telephone numbers can be authenticated via an automated telephone call back feature providing a uniquely generated code, which must be entered by the viewer to the website. It will be appreciated that the process can be reversed, so that a code appears on the screen and the viewer must enter a code into a telephone keypad during the automated call.

Similarly, email addresses can be verified by sending an email with a uniquely generated link that verifies registration information when clicked, or a uniquely generated code for user entry. This service can be used for periodic record updates.

A domain name system (DNS) management service can assist a website administrator user manage a website DNS listing among one or more DNS servers. A management software providing similar functionality can be provided or rented to the user for execution.

A web statistics or analytics service can be provided to measure, collect, analyze and report Internet data for website optimization. Upon activation, an analytics server tracks Internet data for a user-specified website and provides periodic reports responsive to user requests. Web analytics can be off-site, which measures characteristics outside the user website, or on-site, which measures a visitor's journey on the user website.

An online store creation service allows the user to easily create an online store for selling goods or services. For example, the user can authenticate his scratchcard, after which the server collects relevant information (including product description and prices) before automatically generating an online store for the user. Alternatively, a software server can rent out software providing similar functionality.

A cloud computing service provides dynamically scalable and virtualized resources to the user. Using cloud computing services allows users to obtain computing services at greatly reduced cost, improves scalability, provides device and location independence, and improves reliability. In one embodiment, the scratchcard allows user access to a predefined amount of time with a virtualized server service. In another embodiment, the scratchcard is associated with a predefined value, which is deducted as the user utilizes the services. Pricing can vary based on server load, time of day, and other factors. Similarly, a crowdsourcing service can be provided to facilitate outsourcing tasks to a large, undefined group of people or communities.

A language translation service can be written or spoken. A written service can be provided by transmitting (for example, via email or fax) a document to the server, where the document is translated by a computer program or a human translator. The translated document is then transmitted to the user.

A spoken service can be provided in real-time or non-real-time. Real-time interpretation can be provided via phone line or VoIP technology, where the user transmits an audio sample (for example, a speech or a live person) to the server. The server can interpret the audio sample with a human interpreter or a computer program, and transmit the interpreted audio sample back to the user.

Non-real-time audio translation can be similar to written translation, where an audio file is transmitted to the server for processing. The server translates the audio file with a human translator or a computer program, and transmits a translated audio file or a document back to the user.

A conventional web design service, a web hosting service, or an online data backup/storage service can be provided to a user via a prepaid scratchcard, as discussed above. By utilizing a prepaid scratchcard business model, the user's identity and privacy are preserved. Alternatively, a software providing the above functionality can be provided or rented to the user. Alternatively, a management software can be provided or rented to the user to manage the above functionality.

A data synchronization service can be provided. The data synchronization service can include a music library manager allowing users to synchronize music and video libraries across various computers either on a local intranet or across the Internet. This allows users complete access to retrieve, organize and listen to files from one computer to another. Alternatively, a software providing the above functionality can be provided or rented to the user. Alternatively, a management software can be provided or rented to the user to manage the above functionality.

A computer tracking service in event of device theft can be provided. For example, data loss protection systems install clients running on mobile devices or other devices that filter workstation traffic and otherwise monitor device performance. Similarly, a remote kill functionality can be added to mobile devices to allow an administrator to remotely wipe or shut down a stolen mobile device. The service can be provided via a client module installed on the mobile device and a management server.

An online advertising service or management service can be provided. A prepaid scratchcard can provide a balance from which advertising fees are deducted by the server as online advertising services are requested and provided.

A virtual private network (VPN) access module can allow secure access across a network. The VPN is a computer network in which some of the links between nodes are carried by open connections or virtual circuits in some larger network (e.g., the Internet) as opposed to running across a single private network. The link-layer protocols of the virtual network are said to be "tunneled" through the larger network. The scratchcard is associated with a balance or an amount of time during which the user can access the VPN. This can provide security and privacy for user network requests and file transfers.

Alternatively, a software providing the above functionality can be provided or rented to the user. Alternatively, a management software can be provided or rented to the user to manage the above functionality.

It will be appreciated that an amount paid for the scratchcard 202 can be less than an amount required for a product or service. For example, the scratchcard 202 could be sold for $10 and allow registration of a .com domain name. However, the scratchcard 202 is also valid towards a $25 .cn domain name registration. The user 200 can be prompted to pay the remaining balance via a conventional payment method. This can result from system upselling upon user 200 use of the scratchcard 202. A scratchcard purchaser can pre-register a domain name for the user 200, a gift recipient. The scratchcard 202 can be printed with the domain name. The user 200 then utilizes the scratchcard identifier to activate the domain name.

The user 200 can provide personal contact information to the activation server 208 on activation. The activation server 208 can periodically remind the user to renew a continued service or subscription. Resellers can be supported by a domain name registration service. A customized interface is provided to a scratchcard purchaser, which tracks and approves domains to be registered. The scratchcard purchaser then resells the scratchcards to the user 200. The scratchcard purchaser can provide a customized user interface to the user 200 via the activation server 208 with reseller logos, product descriptions, etc. In an alternative embodiment, the scratchcard system can be set up to allow resellers to resell and manage other applications, online software, or services beyond domain name registration. The scratchcard 202 can be equipped with a second, detachable identifier. This allows the purchaser to use the second identifier to log in and customize a message and logo/graphics for eventual user 200. The second identifier is then detached, and the scratchcard 202 provided to the user 200. It will be appreciated that the second identifier can be identical or different from the first identifier.

In one embodiment, the user 200 can create an account associated with a user name and password pair on the activation server 208, the online service server 210, and the online software server 212. A user account can be associated with user information for facilitating future scratchcard use or activity.

In another embodiment, the user account creation process can be mandatory on first log-in by the user 200. In another embodiment, an existing user account can be associated with a service or software to be provided. For example, the user 200 can have a pre-existing user account with the online service server 210 for providing domain name registration. If the user 200 purchases and uses a subsequent prepaid scratchcard for domain name registration or renewal, the domain name and/or the identifier is associated with the user account.

FIG. 3A illustrates a first example procedure for providing online applications and services associated with a scratchcard. The procedure can execute on a system as illustrated above, for example, at the activation server. The activation server communicates with a user workstation over a network. The activation server also communicates with any servers modules that are necessary to provide the requested online application or server. For example, online services can be provided by an online service server and a service provider via a service provider client. For example, online software can be provided via an online software server.

In 300, the activation server tests whether an activation request and scratchcard identifier has been received. The activation request can be received from a user client such as a browser operated by a user.

The scratchcard identifier can be hidden in a concealed information area of a scratchcard, as discussed above. The activation request and scratchcard identifier can be received over a network. For example, the user can purchase a scratchcard at a retail store, scratch and expose the scratchcard identifier on the scratchcard, and use a web browser at a workstation to submit an activation request with the scratchcard identifier and request the online software or service.

In 302, the activation server tests whether the scratchcard identifier is valid. For example, valid scratchcard identifiers can be stored in an accessible memory, either volatile or non-volatile. The activation server checks whether the received scratchcard identifier is equal to one of the valid scratchcard identifiers stored in memory. The scratchcard identifier can be a unique alphanumeric string.

The valid scratchcard identifiers can be generated at the time of scratchcard manufacture, when the concealed information is printed on the scratchcards. This allows the activation server to activate the requested service and prevent counterfeit scratchcards from being activated. Further, the activation server can monitor and analyze activation trends, alerting the system if additional online service or application capacity is needed (for example, in response to a large increase in activation rates).

If the scratchcard identifier is invalid, the activation server may trigger an error condition at 308. The error condition may cause an error message to be displayed at the user workstation and terminate the procedure.

In 304, the activation server activates the scratchcard. Activating the scratchcard can include updating an entry in a database associated with the scratchcard with its activated status. Activating the scratchcard also includes initiating a procedure to provide the requested online service. For example, user information can be collected from the user, forms can be sent to the user, software made available to the user, etc.

In 306, the activation server causes the requested online service to be provided. For example, the activation server can activate a module that provides the online service, such as an online application server, an online service server, or authorizing a service provider to provide the requested service.

In an example embodiment, the online service or application purchased can be integrated with existing services. Existing services include online mapping software, advertising software, Google Apps, blog hosting services, email services, online advertising, widgets, shopping services, etc. By integrating with existing services, such scratchcards increase usability for users and possibly increase revenue, if the existing services generate revenue.

For example, a purchased subscription to an online job posting website can be integrated with online content on how to write a better resume or job description. Online content can include articles, e-books, or similar content. In addition, online content can include services such as career counseling or writing coaches.

For example, a purchased web hosting service can be automatically integrated with a website analytics service such as Google Analytics to monitor and analyze website traffic.

For example, a purchased web hosting service purchased to create an online storefront can be automatically integrated with store features, such as shopping carts, payment processing, etc.

In 310, the procedure may terminate.

Figure 3B:
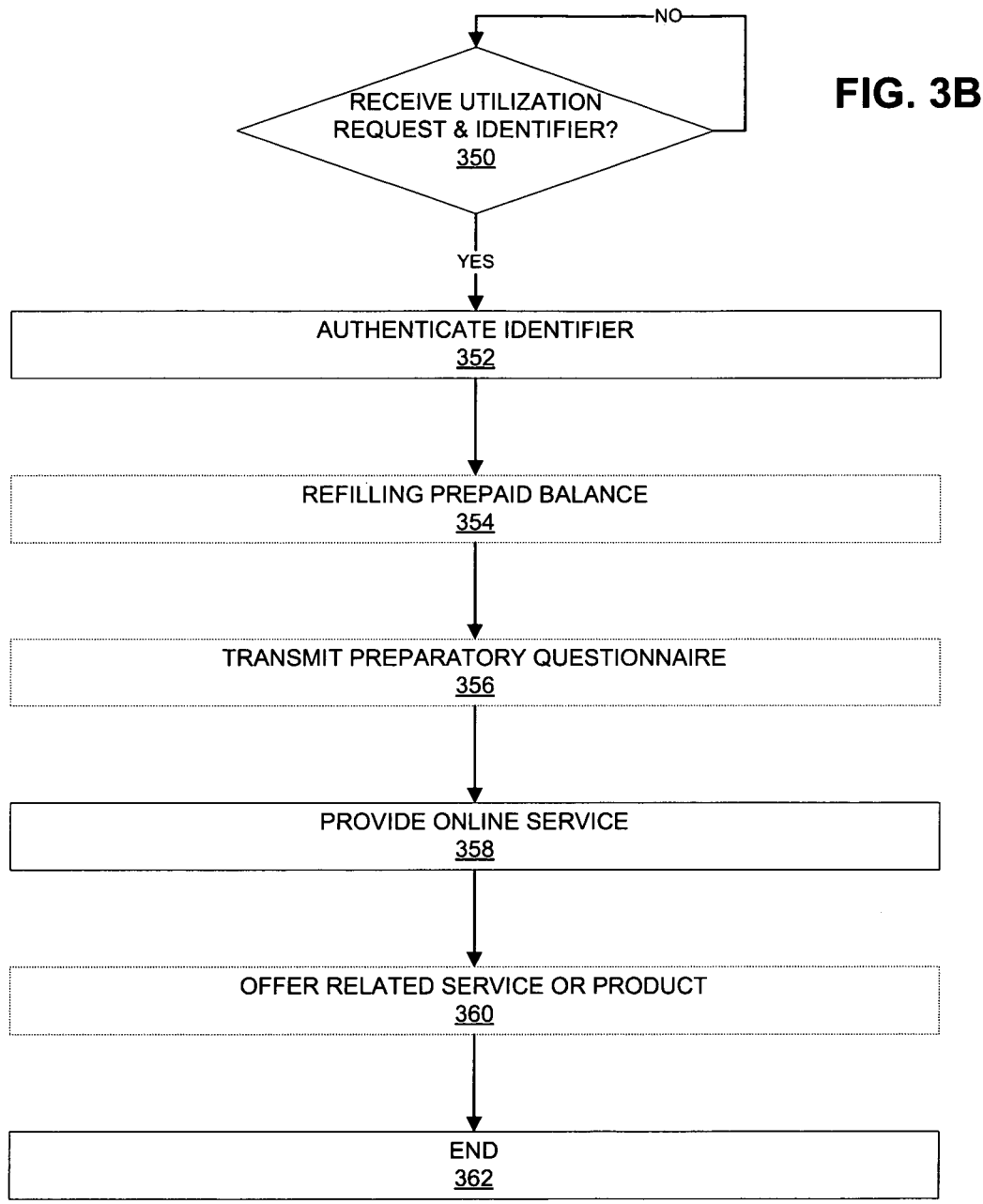
FIG. 3B illustrates a second example procedure for providing online applications and services associated with a scratchcard.

FIG. 3B illustrates a second example procedure for providing online applications and services associated with a scratchcard. For example, the procedure can execute on an activation server in communication with a user workstation, as discussed above.

In 350, the server tests whether a request and a scratchcard identifier has been received over a network. For example, a user can utilize a workstation in communication with the server over a network. The workstation can execute an Internet browser and provide an interface to a server website. The server website can receive a request from the user for an online service. The server website can also receive a scratchcard identifier, provided to the user on a scratchcard as discussed.

In 352, the server authenticates the scratchcard identifier. In one embodiment, the scratchcard identifier is compared against a set of known valid identifiers. If the scratchcard identifier is found, it is valid.

In another embodiment, the scratchcard identifier can be a product of a hashing or other algorithm. The server then executes the algorithm on the scratchcard identifier to determine its validity.

In 354, the server optionally refills a prepaid balance associated with the scratchcard identifier. The user can submit a request to refill the prepaid balance and submit a payment via the network. For example, the request can be received at the network and the payment can be a credit card charge authorization. The server verifies the payment and updates the prepaid balance.

In another embodiment, the user can activate a refill procedure at another predetermined location, such as a retail store counter, an automated kiosk, or other location. In this embodiment, the user submits payment information and a refill request, which is fulfilled by the server.

In 356, the server optionally transmits a preparatory questionnaire to the user. For example, some online services such as will preparation can require certain information from the user. Such information is provided to a service provider, such as an attorney or legal assistant, for use while providing the will. The information can be requested in a preparatory questionnaire, form, or interactive software application transmitted to the user.

In 358, the server provides the requested online service. As discussed above, the online service can be a variety of professional and other services. The server can also decrease the prepaid balance associated with the scratchcard identifier.

In 360, the server optionally offers a related service or product. For example, a request for a will preparation service can trigger other related services, such as insurance sales or financial planning.

In 362, the server exits the procedure.

It will be appreciated that the above procedure can provide online applications, as discussed.

Figures 4A, 4B:
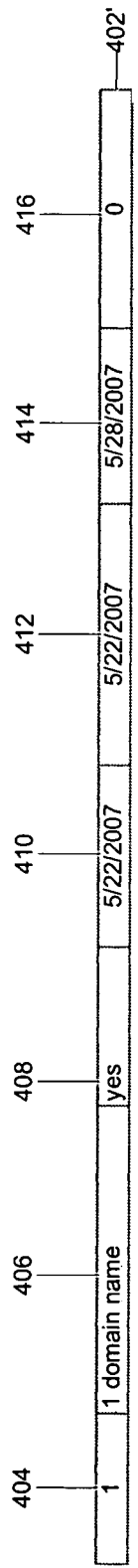
FIG. 4A illustrates an example metadata data structure.
FIG. 4B illustrates an example metadata data structure entry.

FIG. 4A illustrates an example metadata data structure 400. Metadata associated with scratchcards in a prepaid online service and software system as discussed above can be stored in a metadata data structure on a storage medium accessible to a server. The metadata data structure 400 includes a set of records 402, each record representing a scratchcard and its associated metadata.

It will be appreciated that the metadata data structure 400 can be stored in a variety of ways. For example, it can be stored as a tab delimited or comma delimited flat file, in a relational database, in a proprietary file format, or another storage method accessible to a server. Different storage formats will provide different advantages for different applications, as will be appreciated. The metadata data structure can be used for accounting, auditing, fraud-detection, or other purposes.

FIG. 4B illustrates an example metadata data structure entry 402'. Each entry 402' can be a record of a scratchcard, as discussed above. Each record 402' can contain a variety of metadata, such as an identifier 404 associated with the scratchcard. The identifier 404 can be a unique alphanumeric sequence of characters and used to identify a scratchcard within the system.

The record 402' can also include a description 406 that is a text description of the scratchcard. This can be provided printed on a receipt after purchase of the scratchcard.

The record 402' can also include an activation field 408. The activation field 408 can be a Boolean value indicating whether the scratchcard has been activated. As discussed above, a scratchcard can be activated at a point of sale when purchased by a user as a security measure. Alternatively, other activation procedures can be used.

The record 402' can also include a date of sale 410. The date of sale 410 can record a date of sale of the scratchcard. For example, scratchcards can have an expiry date from the date of sale. If necessary, a sale time can also be stored if the time of sale during the day is important, for example, to track sales trends throughout the day.

The record 402' can also include a date of activation 412. The date of activation 412 can store a date of activation of the scratchcard. For example, scratchcards can have an expiration date calculated from the date of activation. Similar to the date of sale, a time of activation can also be stored.

The record 402' can also include a date of use 414. The date of use 414 can store one or more dates on which the scratchcard was use. For a one-use scratchcard, such as a one-use domain name registration scratchcard, there is only one date in date of use field. For multi-use scratchcards, date of use will include a set of dates. Similar to the date of sale, a time of use can also be stored.

The record 402' can also include a remaining value 416. The remaining value 416 can store a number of remaining uses left on the scratchcard. For a one-use scratchcard, such as a one-use domain name registration scratchcard, the remaining value decrements to zero after the first use. For multi-use scratchcards, this field tracks remaining value on the scratchcard.

It will be appreciated that any amount and type of metadata may be associated with each card for other purposes.

FIG. 5 illustrates an example workstation for accessing online software and services. The workstation 500 can provide a user interface to a user 502. In one example, the workstation 500 can be configured to receive 3D object components, including a texture, from a server or a data store over a network.

The workstation 500 can be a computing device such as a server, a personal computer, desktop, laptop, a personal digital assistant (PDA) or other computing device. The workstation 500 is accessible to the user 502 and provides a computing platform for various applications.

The workstation 500 can include a display 504. The display 504 can be physical equipment that displays viewable images and text generated by the workstation 500. For example, the display 504 can be a cathode ray tube or a flat panel display such as a TFT LCD. The display 504 includes a display surface, circuitry to generate a picture from electronic signals sent by the workstation 500, and an enclosure or case. The display 504 can interface with an input/output interface 510, which translate data from the workstation 500 to signals for the display 504.

The workstation 500 may include one or more output devices 506. The output device 506 can be hardware used to communicate outputs to the user. For example, the output device 506 can include speakers and printers, in addition to the display 504 discussed above.

The workstation 500 may include one or more input devices 508. The input device 508 can be any computer hardware used to translate inputs received from the user 502 into data usable by the workstation 500. The input device 508 can be keyboards, mouse pointer devices, microphones, scanners, video and digital cameras, etc.

The workstation 500 includes an input/output interface 510. The input/output interface 510 can include logic and physical ports used to connect and control peripheral devices, such as output devices 506 and input devices 508. For example, the input/output interface 510 can allow input and output devices 506 and 508 to be connected to the workstation 500.

The workstation 500 includes a network interface 512. The network interface 512 includes logic and physical ports used to connect to one or more networks. For example, the network interface 512 can accept a physical network connection and interface between the network and the workstation by translating communications between the two. Example networks can include Ethernet, the Internet, or other physical network infrastructure. Alternatively, the network interface 512 can be configured to interface with a wireless network. Alternatively, the workstation 500 can include multiple network interfaces for interfacing with multiple networks.

The workstation 500 communicates with a network 514 via the network interface 512. The network 514 can be any network configured to carry digital information. For example, the network 514 can be an Ethernet network, the Internet, a wireless network, a cellular data network, or any Local Area Network or Wide Area Network.

The workstation 500 includes a central processing unit (CPU) 516. The CPU 516 can be an integrated circuit configured for mass-production and suitable for a variety of computing applications. The CPU 516 can be installed on a motherboard within the workstation 500 and control other workstation components. The CPU 516 can communicate with the other workstation components via a bus, a physical interchange, or other communication channel.

The workstation 500 includes a memory 518. The memory 518 can include volatile and non-volatile memory accessible to the CPU 516. The memory can be random access and store data required by the CPU 516 to execute installed applications. In an alternative, the CPU 516 can include on-board cache memory for faster performance.

The workstation 500 includes mass storage 520. The mass storage 520 can be non-volatile storage configured to store large amounts of data. The mass storage 520 can be accessible to the CPU 516 via a bus, a physical interchange, or other communication channel. For example, the mass storage 520 can be a hard drive, a RAID array, flash memory, CD-ROMs, DVDs, HD-DVD or Blu-Ray mediums.

The workstation 500 can include an access module 522. In one example embodiment, the workstation 500 can execute the access module 522 to communicate with the activation, online service, and online software servers discussed above. The access module 522 can include a predefined communication protocol.

FIG. 6 illustrates an example server for providing online software and services. A server 600 is configured to process requests received from a user, as discussed above. For example, the server 600 can be configured to communicate over a plurality of networks. Alternatively, the server 600 can be any computing device.

The server 600 includes a display 602. The display 602 can be any equipment that displays viewable images, graphics, and text generated by the server 600. For example, the display 602 can be a cathode ray tube or a flat panel display such as a TFT LCD. The display 602 includes a display surface, circuitry to generate a viewable picture from electronic signals sent by the server 600, and an enclosure or case. The display 602 can interface with an input/output interface 608, which converts data from a central processor unit 612 to a format compatible with the display 602.

The server 600 includes one or more output devices 604. The output device 604 can be any hardware used to communicate outputs to the user. For example, the output device 604 can be audio speakers and printers or other devices for providing output.

The server 600 includes one or more input devices 606. The input device 606 can be any computer hardware used to receive inputs from the user. The input device 606 can include keyboards, mouse pointer devices, microphones, scanners, video and digital cameras, etc.

The server 600 includes an input/output interface 608. The input/output interface 608 can include logic and physical ports used to connect and control peripheral devices, such as output devices 604 and input devices 606. For example, the input/output interface 608 can allow input and output devices 604 and 606 to communicate with the server 600.

The server 600 includes a network interface 610. The network interface 610 includes logic and physical ports used to connect to one or more networks. For example, the network interface 610 can accept a physical network connection and interface between the network and the workstation by translating communications between the two. Example networks can include Ethernet, the Internet, or other physical network infrastructure. Alternatively, the network interface 610 can be configured to interface with wireless network. Alternatively, the server 600 can include multiple network interfaces for interfacing with multiple networks.

The server 600 includes a central processing unit (CPU) 612. The CPU 612 can be an integrated circuit configured for mass-production and suited for a variety of computing applications. The CPU 612 can sit on a motherboard within the server 600 and control other workstation components. The CPU 612 can communicate with the other workstation components via a bus, a physical interchange, or other communication channel.

The server 600 includes memory 614. The memory 614 can include volatile and non-volatile memory accessible to the CPU 612. The memory can be random access and provide fast access for graphics-related or other calculations. In one embodiment, the CPU 612 can include on-board cache memory for faster performance.

The server 600 includes mass storage 616. The mass storage 616 can be volatile or non-volatile storage configured to store large amounts of data. The mass storage 616 can be accessible to the CPU 6.12 via a bus, a physical interchange, or other communication channel. For example, the mass storage 616 can be a hard drive, a RAID array, flash memory, CD-ROMs, DVDs, HD-DVD or Blu-Ray mediums.

The server 600 communicates with a network 618 via the network interface 610. The network 618 can be as discussed. The server 600 can communicate with a mobile device over the cellular network 618.

Alternatively, the network interface 610 can communicate over any network configured to carry digital information. For example, the network interface 610 can communicate over an Ethernet network, the Internet, a wireless network, a cellular data network, or any Local Area Network or Wide Area Network.

The server 600 can include various modules to manage the system discussed above. For example, a service module 620 can facilitate online services provided to users over the network 618. A software module 622 can facilitate online software provided to users over the network 618. In one embodiment, an activation and management module manages the prepaid card system.

FIG. 7 illustrates an example mobile device for accessing online software and services. The mobile device 700 can be a cellular phone, a PDA, or a similar portable device used by a user 702. The mobile device 700 is configured to access a prepaid online service or software system, as discussed above.

The mobile device 700 can include a processor 704. The processor 704 can be a general purpose processor configured to execute computer-readable instructions operating the mobile device 700 and associated peripherals. It will be appreciated that any number of processors can be included in the mobile device 700, including specialized processors.

The mobile device 700 can include a location determining module 706. The module 706 can be a GPS receiver module configured to receive GPS signals and calculate a physical location of the mobile device 700 based on the received GPS signals and an internal clock time. The physical location calculation can be optimized by, for example, averaging the GPS signals over time or incorporating a signal from a known nearby location.

Alternatively, the module 706 can calculate a physical location by cellular signal triangulation or via short-range wireless network detection.

The mobile device 700 can include a clock 708. The clock 708 can provide a local time. The clock 708 can also provide an internal time for use with the GPS module. The clock 708 can be periodically updated from a server in communications with the mobile device 700.

The mobile device 700 includes an accelerometer 710. The accelerometer 710 can be configured to detect movement of the mobile device 700 and convert the movement into digital signals transmitted to the processor 704.

The mobile device 700 includes additional sensors 712. Additional sensors can include audio input devices or optical input devices. Audio input devices can include microphones. Optical input devices can include cameras or light sensors. The sensors 712 can be configured to detect appropriate input and convert the input into input signals transmitted to the processor 702.

The mobile device 700 can include a network interface 714. For example, the network interface 714 can communicate with a cellular wireless network, a wired network such as Ethernet, or a short range. wireless network such as Bluetooth or Wi-Fi. The mobile device 700 can include multiple network interfaces or a network interface configured to interface with multiple networks. Wireless network interfaces can communicate via an antenna 720.

An Ethernet network allows the mobile device 700 to communicate when plugged in. The mobile device 700 can be assigned an IP address on the wired network. A short-range wireless network can be a Wi-Fi, Wi-Bree or Bluetooth network.

The mobile device 700 can include an input/output interface 716. The interface 716 can receive user inputs from an input device and convert the user inputs into user commands. For example, input devices can include a touch screen display, a keypad, a microphone, an optical device, a pointer device, a scroll wheel, or other input devices.

The interface 716 can also transmit output to an output device in a form accessible to the user 702. For example, output devices can include a touch screen, a display screen, a speaker, an audio-out jack, an electro-mechanical motor for providing tactile output, or other output devices.

The mobile device 700 can include a memory 718. The memory 718 can be read-only or read-write, persistent or volatile storage memory accessible to the processor 704. The memory 718 can store data required by the mobile device 700 for operation and applications for execution.

The mobile device 700 can include an antenna 720. The antenna 720 can be configured to transmit and receive wireless signals from a wireless network.

The mobile device 700 can store an access module 722. The access module 722 can interface with an activation server as illustrated above and help provide a requested online service or software. In one example, the access module 722 can transmit sensor readings such as a current location or accelerations of the mobile device 700.

In operation, the online software or service can be dependent on a current location of the mobile device. For example, different versions of an online software can be provided depending on a mobile device location, each version in a different language. For example, the server can select an online service provider in the same geographical location as the user 702, to eliminate time zone differences.

As discussed above, one example embodiment of the present invention is a method for providing an online service over a network. The method includes receiving a request to utilize the online service and a scratchcard identifier, wherein the scratchcard identifier is provided to the user on a concealed information area of a scratchcard. The method includes authenticating the scratchcard identifier against a list of valid identifiers. The method includes decreasing a prepaid balance associated with the scratchcard identifier. The method includes providing the online service, wherein the online service includes two-way interaction between the user and a service provider over the network. The online service can be at least one of: accounting service, legal service, and audit service. The prepaid balance can be deducted after aggregating multiple micro payments. The online service can be accessed from a user mobile device and provided in a location-dependent manner. The method includes receiving indication that the user has provided valuable consideration. The method includes increasing the prepaid balance associated with the scratchcard identifier. The method includes offering the user a related online service or product. The method includes transmitting a preparatory questionnaire to the user for completion before providing the online service.

Another embodiment of the present invention can be a system for providing an online software over a network. The system includes a scratchcard including a scratchcard identifier in a concealed information area. The system includes a network interface in communication with a user over a network. The system includes a server. The server can be configured to receive a request to utilize the online software and the scratchcard identifier. The server can be configured to authenticate the scratchcard identifier against a list of valid identifiers. The server can be configured to decrease a prepaid balance associated with the scratchcard identifier. The server can be configured to provide the online software, wherein the online software executes at the server and interacts with the user over the network. The online software can be at least one of: a word processor, a spreadsheet, and a presentation application. The prepaid balance can be deducted after aggregating multiple micro payments. The online service can be accessed from a user mobile device and provided in a location-dependent manner. The server can be configured to receive indication that the user has provided valuable consideration. The server can be configured to increase the prepaid balance associated with the scratchcard identifier. The server can be configured to offer the user a related online software or product. The server can be configured to transmit a local client for execution by a user terminal, the local client configured to communicate with the server.

Another embodiment of the present invention can be a computer-readable medium including instructions adapted to execute a method for providing an online service over a network. The method includes receiving a request to utilize the online service and a scratchcard identifier, wherein the scratchcard identifier is provided to the user on a concealed information area of a scratchcard. The method includes authenticating the scratchcard identifier against a list of valid identifiers. The method includes decreasing a prepaid balance associated with the scratchcard identifier. The method includes providing the online service, wherein the online service includes two-way interaction between the user and a service provider over the network. The online service can be at least one of: accounting service, legal service, and audit service. The prepaid balance can be deducted after aggregating multiple micro payments. The online service can be accessed from a user mobile device and provided in a location-dependent manner. The method includes receiving indication that the user has provided valuable consideration. The method includes increasing the prepaid balance associated with the scratchcard identifier. The method includes offering the user a related online service or product. The method includes transmitting a preparatory questionnaire to the user for completion before providing the online service.

The specific embodiments described in this document represent examples or embodiments of the present invention, and are illustrative in nature rather than restrictive. In the above description, for purposes of explanation, numerous specific details are set forth in order to provide a thorough understanding of the invention. It will be apparent, however, to one skilled in the art that the invention can be practiced without these specific details.

Reference in the specification to "one embodiment" or "an embodiment" or "some embodiments" means that a particular feature, structure, or characteristic described in connection with the embodiment is included in at least one embodiment of the present invention. Features and aspects of various embodiments may be integrated into other embodiments, and embodiments illustrated in this document may be implemented without all of the features or aspects illustrated or described. It will be appreciated to those skilled in the art that the preceding examples and embodiments are exemplary and not limiting.

While the system, apparatus and method have been described in terms of what are presently considered to be the most practical and effective embodiments, it is to be understood that the disclosure need not be limited to the disclosed embodiments. It is intended that all permutations, enhancements, equivalents, combinations, and improvements thereto that are apparent to those skilled in the art upon a reading of the specification and a study of the drawings are included within the true spirit and scope of the present invention. The scope of the disclosure should thus be accorded the broadest interpretation so as to encompass all such modifications and similar structures. It is therefore intended that the application includes all such modifications, permutations and equivalents that fall-within the true spirit and scope of the present invention.

What is claimed is:

1. A method for providing an online service over a network, comprising:
    providing a scratchcard to a user, the scratchcard comprising a concealed information area containing a scratchcard identifier and a computer-readable medium containing at least one user-completable form in an encrypted state;
    receiving, by a server, a request from the user to utilize the online service, the scratchcard identifier, and at least one of the user-completable forms, the form at least partially completed;
    authenticating, by the server, the scratchcard identifier against a list of valid identifiers;
    decreasing a prepaid balance associated with the scratchcard identifier;

after authentication, providing, by the server, at least a portion of the at least one at least partially completed form to a service provider; and providing the online service, wherein the online service includes two-way interaction between the user and service provider over the network, the interaction being based on the at least one at least partially completed form.

2. The method of claim 1, wherein the online service is at least one of:

accounting service, legal service, and audit service.

3. The method of claim 1, wherein the prepaid balance is deducted after aggregating multiple micro payments.

4. The method of claim 1, wherein the online service is accessed from a user mobile device and provided in a location-dependent manner.

5. The method of claim 1, further comprising: receiving indication that the user has provided valuable consideration; and increasing the prepaid balance associated with the scratchcard identifier.

6. The method of claim 5, further comprising: offering the user a related online service or product.

7. The method of claim 1, further comprising: transmitting a preparatory questionnaire to the user for completion before providing the online service.

8. A system for providing an online software over a network, comprising:

a scratchcard including a scratchcard identifier in a concealed information area and a computer-readable medium containing at least one user-completable form in an encrypted state;

a network interface in communication with a user over a network; and a server, the server configured to:
  receive a request to utilize the online software, the scratchcard identifier, and at least one of the user-completable forms, the form at least partially completed;
  authenticate the scratchcard identifier against a list of valid identifiers;
  decrease a prepaid balance associated with the scratchcard identifier;
  after authentication, provide at least a portion of the at least one at least partially completed form to a service provider, and
  provide the online software, wherein the online software executes at the server and interacts with the user over the network, the interaction being based on the at least one at least partially completed form.

9. The system of claim 8, wherein the online software is at least one of: a word processor, a spreadsheet, and a presentation application.

10. The system of claim 8, wherein the prepaid balance is deducted after aggregating multiple micro payments.

11. The system of claim 8, wherein the online software is accessed from a user mobile device and provided in a location-dependent manner.

12. The system of claim 8, the server further configured to, receive indication that the user has provided valuable consideration; and increase the prepaid balance associated with the scratchcard identifier.

13. The system of claim 12, the server further configured to, offer the user a related online software or product.

14. The system of claim 8, the server further configured to, transmit a local client for execution by a user terminal, the local client configured to communicate with the server.

15. A non-transitory computer-readable medium including instructions adapted to execute a method for providing an online service over a network, the method comprising:

receiving a request from a user to utilize the online service, a scratchcard identifier from a scratchcard with a concealed information area containing the scratchcard identifier, and at least one at least partially completed form of one or more user-completable forms from the scratchcard comprising a computer-readable medium containing the one or more user-completable forms in an encrypted state;

authenticating the scratchcard identifier against a list of valid identifiers;

decreasing a prepaid balance associated with the scratchcard identifier;

after authentication, providing at least a portion of the at least one at least partially completed form to a service provider, and providing the online service, wherein the online service includes two-way interaction between the user and service provider over the network, the interaction being based on the at least one at least partially completed form.

16. The medium of claim 15, wherein the online service is at least one of:

accounting service, legal service, and audit service.

17. The medium of claim 15, wherein the prepaid balance is deducted after aggregating multiple micro payments.

18. The medium of claim 15, wherein the online service is accessed from a user mobile device and provided in a location-dependent manner.

19. The medium of claim 15, the method further comprising:

receiving indication that the user has provided valuable consideration;

increasing the prepaid balance associated with the scratchcard identifier; and offering the user a related online service or product.

20. The medium of claim 15, the method further comprising: transmitting a preparatory questionnaire to the user for completion before providing the online service.

* * * * *